Patented Apr. 21, 1931

1,802,204

UNITED STATES PATENT OFFICE

HEINZ EICHWEDE AND ERICH FISCHER, OF HOCHST-ON-THE-MAIN, GERMANY, ASSIGNORS TO GENERAL ANILINE WORKS, INC., OF NEW YORK, N. Y., A CORPORATION OF DELAWARE

PROCESS OF DYEING CELLULOSE ETHERS

No Drawing. Application filed November 9, 1925, Serial No. 68,026, and in Germany November 25, 1924.

It is known that for dyeing cellulose esters or ethers, particularly acetate silk, there are prominently suitable those of the monoazo dyestuffs which are neither of a very pronounced acid character nor of a very pronounced basic character.

Now we have found that basic monoazo dyestuffs of the general formula:

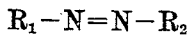

in which $R_1$ represents a substituted aromatic radicle containing in the nucleus not more than ten carbon atoms, at least one substituent being a sulfamino group, and $R_2$ represents a substituted aromatic radicle containing in the nucleus not more than ten carbon atoms, at least one substituent being a group which contains a trivalent nitrogen attached to the aromatic nucleus, are eminently suitable for the dyeing of cellulose esters. These dyestuffs give intense dyeings of excellent properties as to fastness.

The following example will serve to illustrate our invention:—

1 kilogram of acetate silk is introduced into a dye bath of 20–25 liters in which 30 grams of the hydrocloride of the dyestuff of the following formula:

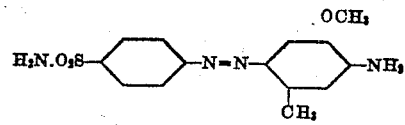

obtained from diazotized 4-aminobenzene-1-sulfamide and aminocresol ether, are dissolved. The dye-bath is slowly heated and the material manipulated therein for ½ hour at about 70° C. There are then added 200 grams of ammonium acetate and the bath is kept for another half hour at 70° whereupon the material is rinsed and dried. In this manner a vivid golden-yellow tint of excellent fastness is obtained.

If instead of the dyestuff named in the foregoing example is used, for instance, the dyestuff of the following formula:

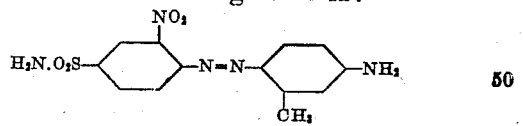

from diazotized 2-nitro-1-aminobenzene-4-sulfamide coupled with m-toluidine, an intense orange tint is obtained, whereas for instance the dyestuff of the following formula:

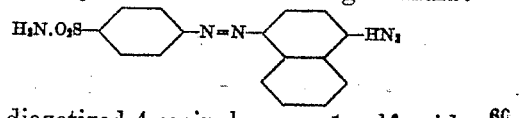

from diazotized 4-aminobenzene-1-sulfamide coupled with d-naphthylamine gives a deep reddish-orange tint. In a similar manner there may be largely varied both the diazo- and the coupling components in order to obtain good tints.

By the term "cellulose ethers" we include in the following claims not only the cellulose ethers themselves but also the cellulose esters.

We claim:—

1. Process of dyeing cellulose ethers with basic monoazo dyestuffs of the general formula:

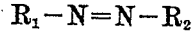

in which $R_1$ represents a substituted aromatic radicle containing in the nucleus not more than ten carbon atoms, at least one substituent being a sulfamino group, and $R_2$ represents a substituted aromatic radicle containing in the nucleus not more than ten carbon atoms, at least one substituent being a group which contains a trivalent nitrogen attached to the aromatic nucleus.

2. Process of dyeing cellulose ethers, which consists in dyeing these ethers with a monoazo dystuffs of the following formula:

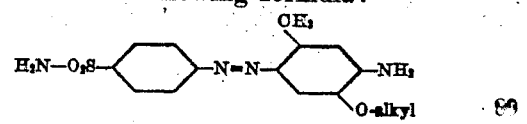

3. As new products cellulose ethers dyed with basic monoazo dyestuffs of the general formula:

$$R_1-N=N-R_2$$

in which $R_1$ represents a substituted aromatic radicle containing in the nucleus not more than ten carbon atoms, at least one substituent being a sulfamino group, and $R_2$ represents a substituted aromatic radicle containing in the nucleus not more than ten carbon atoms, at least one substituent being a group which contains a trivalent nitrogen attached to the aromatic nucleus.

4. As new products, cellulose ethers dyed with basic monoazo dyestuffs of the following formula:

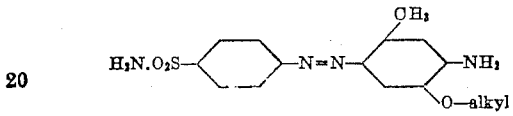

In testimony whereof, we affix our signatures.

HEINZ EICHWEDE.
ERICH FISCHER.